(12) United States Patent
Koda et al.

(10) Patent No.: US 7,604,179 B2
(45) Date of Patent: Oct. 20, 2009

(54) SCANNED MEDIUM, AND MANUFACTURING APPARATUS AND METHOD THEREFOR

(75) Inventors: Yasunori Koda, Kanagawa (JP); Shoji Yamaguchi, Kanagawa (JP); Kunihiro Takahashi, Kanagawa (JP); Mario Fuse, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 266 days.

(21) Appl. No.: 11/390,161

(22) Filed: Mar. 28, 2006

(65) Prior Publication Data

US 2007/0040037 A1    Feb. 22, 2007

(30) Foreign Application Priority Data

Aug. 16, 2005    (JP)    .............................. 2005-235783

(51) Int. Cl.
*G06K 19/06*    (2006.01)

(52) U.S. Cl. ....................... 235/493; 235/380; 235/487; 340/572.1

(58) Field of Classification Search .................. 235/492, 235/380; 340/572.1
See application file for complete search history.

(56) References Cited

U.S. PATENT DOCUMENTS

2002/0140557 A1 *   10/2002   Dukler et al. ............ 340/572.1

FOREIGN PATENT DOCUMENTS

| EP | 901099 A2 * | 3/1999 |
| JP | A-07-032778 | 2/1995 |
| JP | 11085940 A * | 3/1999 |
| JP | A-2002-317398 | 10/2002 |

* cited by examiner

*Primary Examiner*—Daniel A Hess
*Assistant Examiner*—Rafferty Kelly
(74) *Attorney, Agent, or Firm*—Oliff & Berridge, PLC (57) ABSTRACT

A scanned medium including: a sheet substrate; and a line-shaped magnetic body formed inside the sheet substrate, wherein the magnetic properties of the magnetic body are detected inside a magnetic field formed by a scanning apparatus, and the magnetic body has at least a portion thereof formed so as to have the same directional component as that of the magnetic field, regardless of the direction in which the sheet substrate is positioned.

3 Claims, 7 Drawing Sheets

SCANNED MEDIUM, AND MANUFACTURING APPARATUS AND METHOD THEREFOR

CROSS-REFERENCE TO RELATED APPLICATION

This application claims priority under 35 U.S.C. 119 from Japanese Patent Application No. 2005-235783, the disclosure of which is incorporated by reference herein.

BACKGROUND

1. Technical Field

The present invention relates to a scanned medium where a magnetic body is formed within a sheet-shaped substrate, and to a scanned medium manufacturing apparatus and a scanned medium manufacturing method. The present invention relates to, for example, a scanned medium where a magnetic body can be scanned and detected due to the formation of a magnetic body having magnetic properties inside a sheet substrate. The magnetic properties of the magnetic body are magnetization reversal or magnetorestrictive oscillations that occur when a preset alternating electrical field is applied. As mentioned, the present invention also relates to a manufacturing apparatus and manufacturing method for this scanned medium.

2. Related Art

In recent years, several methods have been proposed in order to discern items for the purpose of strengthening security. An item is discerned by measuring the strength of the magnetized reverse magnetic fields of each magnetic element embedded in the item.

With these methods, magnetic elements that generate signals that are difficult to imitate are set in a small portable terminal such as an IC card. When this card is used, inquiry is made as to its existence by the application of an alternating electrical field, and the inherent signals of the magnetic elements set in the portable terminal are detected due to sudden magnetization reversal. Due to this, the small portable terminal is identified and security is ensured.

SUMMARY

According to an aspect of the present invention, there is provided a scanned medium including: a sheet substrate; and a line-shaped magnetic body formed inside the sheet substrate, wherein the magnetic properties of the magnetic body are detected inside a magnetic field formed by a scanning apparatus, and the magnetic body has at least a portion thereof formed so as to have the same directional component as that of the magnetic field, regardless of the direction in which the sheet substrate is positioned.

BRIEF DESCRIPTION OF THE DRAWINGS

Preferred embodiments of the present invention will be described in detail based on the following figures, wherein.

DETAILED DESCRIPTION

Hereafter, the best modes for practicing the scanned media producing device according to the present invention will be explained based on the drawings.

Figure 1:
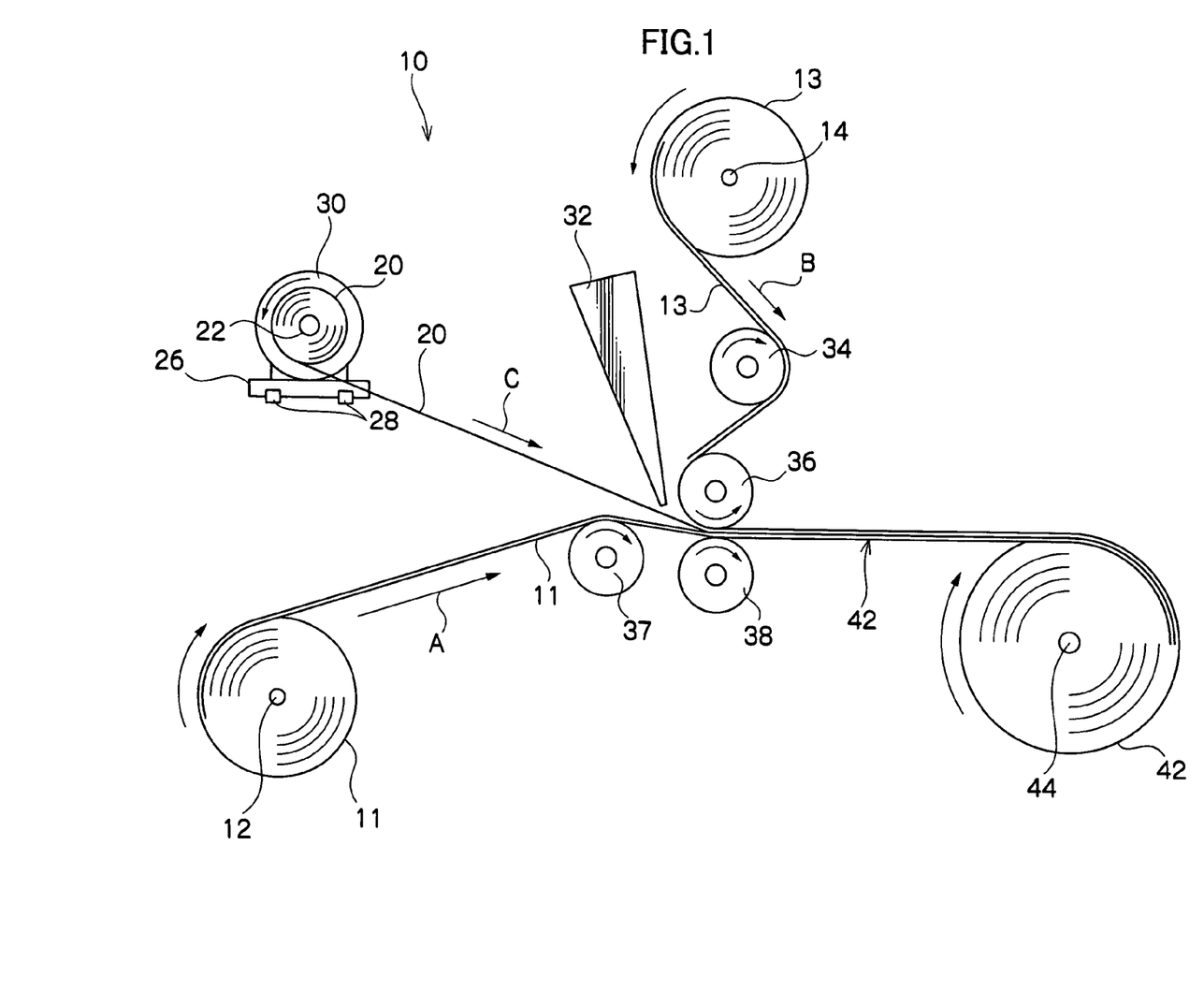
FIG. 1 is a structural outline drawing showing a scanned medium manufacturing apparatus according to a first embodiment of the present invention.

A scanned medium manufacturing apparatus 10 according to the first embodiment is shown in FIG. 1.

This scanned medium manufacturing apparatus 10 is a device called a laminator that sticks together a first substrate 11 and a second substrate 13 comprising paper made from plant pulp. The scanned medium manufacturing apparatus 10 is equipped with a sending roller 12 on which the first substrate 11 is wound to, and a sending roller 14 on which the second substrate 13 is wound to, set above the sending out direction of the sending roller 12. The sending roller 12 and the sending roller 14 are axially supported so as to be rotatable. The sending roller 12 in FIG. 1 rotates in the clockwise direction while the sending roller 14 rotates in the counterclockwise direction, whereby the first substrate 11 and the second substrate 13 are sent out respectively in the directions of the A and B arrows.

Figure 2:
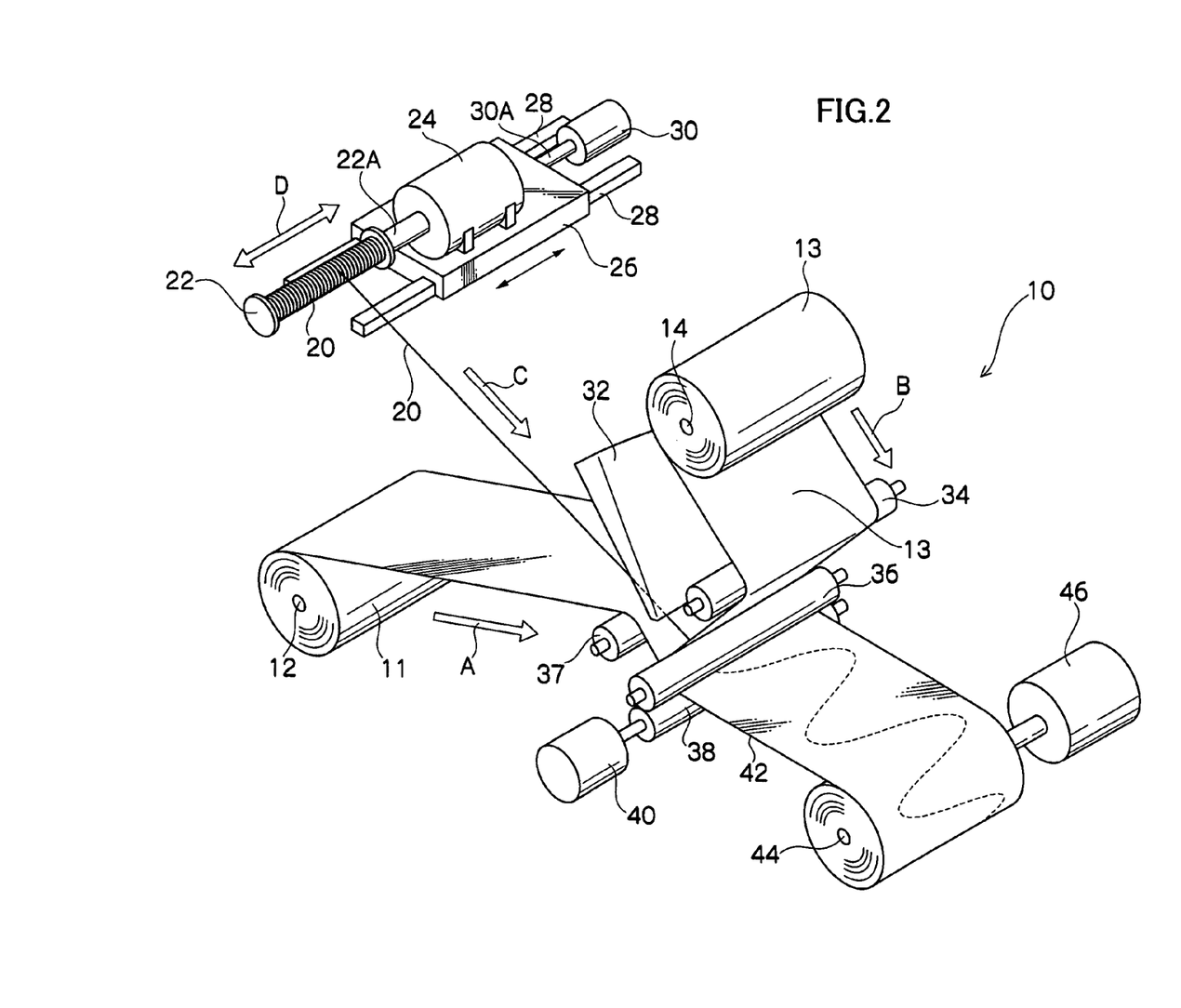
FIG. 2 is a perspective drawing showing a scanned medium manufacturing apparatus according to the first embodiment of the present invention.

As shown in FIG. 2, a bobbin 22 that is axially supported to be rotatable has a magnetic wire 20 wound thereon and is positioned diagonally above the sending roller 12. A motor 24 is connected to an axis 22A of the bobbin 22 and the bobbin 22 rotates in FIG. 1 in the counterclockwise direction, whereby the magnetic wire 20 is sent out in the direction of the C arrow. The motor 24 is supported by a support component 26, which can move on a pair of rails 28. The rails 28 are fixed to and supported by a frame that is not shown in the drawings. Further, a solenoid 30 is fixed to and supported by a frame that is not shown in the drawings. A rod 30A of the solenoid 30 is connected to the support component 26, which is configured to move back and forth in a direction that substantially intersects with the direction of the axial line of the magnetic wire 20 due to the rod 30A pulling back. Due to this, the bobbin 22, which is also connected to the motor 24, moves back and forth in the direction of the D arrow. This back and forth movement is set so that the bobbin 22 cyclically moves left and right from a fixed position by adjusting the retreating of the rod 30A.

An adhesive coating device 32 that supplies adhesive to the magnetic wire 20 is arranged at the downstream side of the direction of movement of the magnetic wire 20. This adhesive coating device 32 supplies a constant amount of adhesive of the same width as the paper being laminated from nozzles (not shown) being placed at the edge of the accommodating unit for the adhesive. That is, the structure is such that the magnetic wire 20 is also laminated with two papers simultaneously while the papers are laminated with the adhesive. A polyethylene resin or a starch-type or urethane-type adhesive can be also used for the adhesive.

A support roller 34 is arranged at the downstream side of the sending out direction of the second substrate 13. Further, a support roller 37 is arranged at the downstream side of the direction in which the first substrate 11 is sent out. The second substrate 13 is wound around and moved to the support roller 34. A pair of rollers 36 and 38 is arranged at the downstream side of the support roller 34 and the support roller 37. The rollers 36 and 38 pull in the second substrate 13, the magnetic wire 20 sent out from the bobbin 22, and the first substrate 11, and then press all of these components together. As shown in FIG. 2, the axis of the roller 38 is connected to a motor 40, which makes the roller 38 rotate in the clockwise direction of FIG. 1. The roller 36 is driven to rotate with the rotation of the roller 38. The magnetic wire 20 coated with adhesive is sandwiched in between the first substrate 11 and the second substrate 13 at the pressing portions of the rollers 36 and 38, and the first substrate 11 and the second substrate 13 are laminated with adhesive.

A wind-up roller 44 is also arranged at the downstream side of the conveying direction of the rollers 36 and 38, and a motor 46 is connected to the wind-up roller 44. The wind-up roller 44 rotates in the clockwise direction of FIG. 1 due to the motor 46, and winds up a scanned medium 42 laminated at the pressing portions of the rollers 36 and 38.

The motors 24, 40, and 46 are stepping motors. The speeds at which the first substrate 11 and the second substrate 13 are conveyed, the magnetic wire 20 is sent out, and the first substrate 11 and the second substrate 13 are wound up are all regulated.

Next, the operation of the scanned medium manufacturing apparatus 10 will be explained.

The first substrate 11 sent out from the sending roller 12 moves in the direction of the arrow A and the second substrate 13 sent out from the sending roller 14 moves in the direction of the arrow B. The second substrate 13 moves in a direction that is approximately 90° relative to the direction of the arrow B via the support roller 34. Further, the magnetic wire 20 is sent out in the direction of the arrow C due to the rotation of the bobbin 22. At that time, the bobbin 22 moves back and forth in the left and right directions (i.e., in the directions of the arrow D) from a fixed position due to the retraction of the rod 30A of the solenoid 30. Adhesive is supplied to the sent out magnetic wire 20 from the adhesive coating device 32.

Figure 4A:
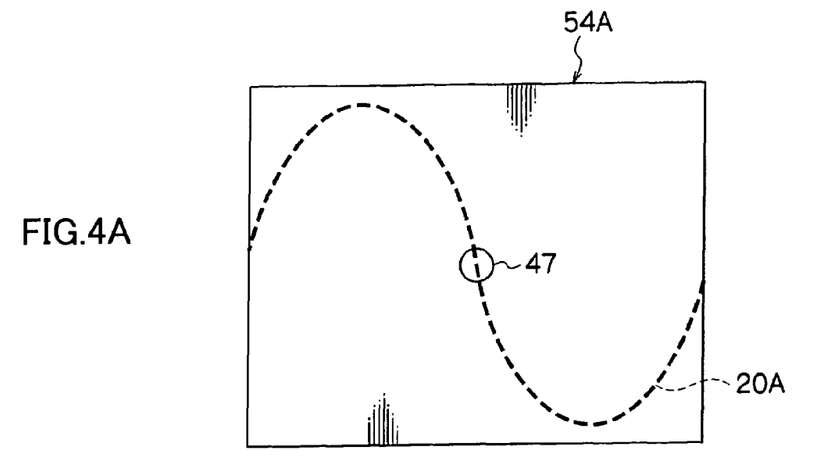
FIGS. 4A-4C are drawings showing examples of the forms of the magnetic wire of the scanned medium.
Figure 4B:
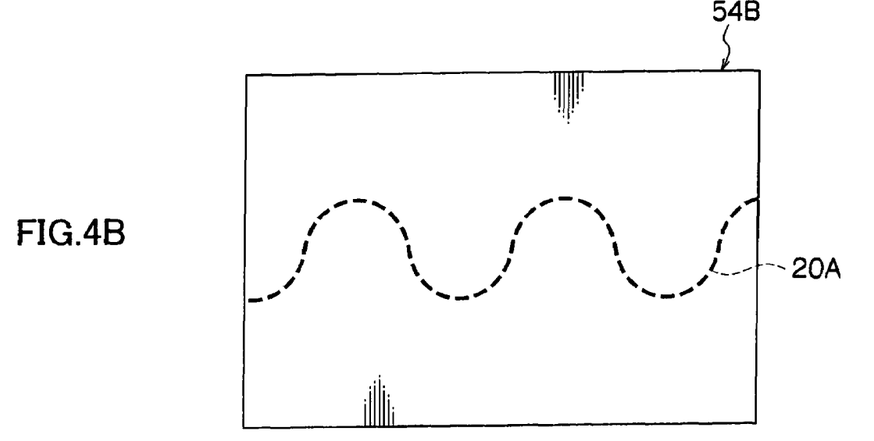
Figure 4C:
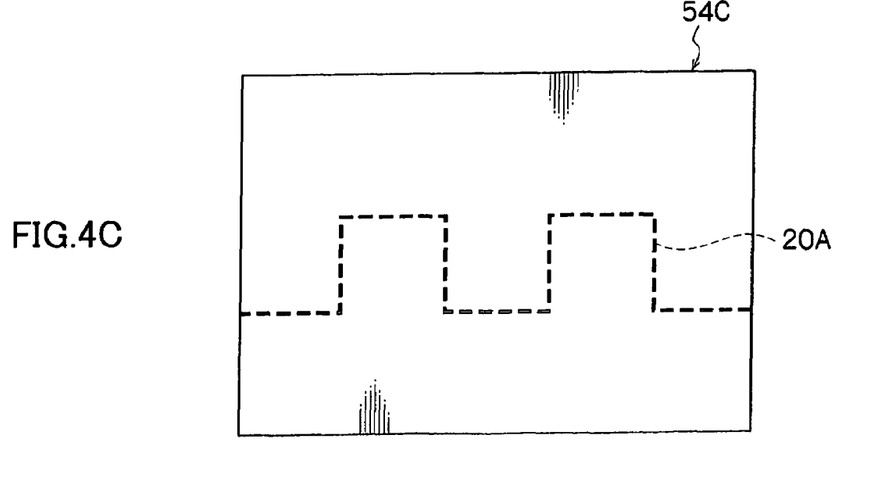

Then the first substrate 11, the magnetic wire 20, and second substrate 13 are all pulled in by the rollers 36 and 38, and these components are laminated with adhesive in a state where the magnetic wire 20 is sandwiched in between the first substrate 11 and the second substrate 13. The laminated scanned medium 42 is then wound up by the wind-up roller 44 at the downstream side of the direction of movement. As shown in FIGS. 4A-4C, the rolled up scanned medium 42 is cut at preset measurements (e.g., A4 size) and is used as a scanned medium 54A.

Figure 3:
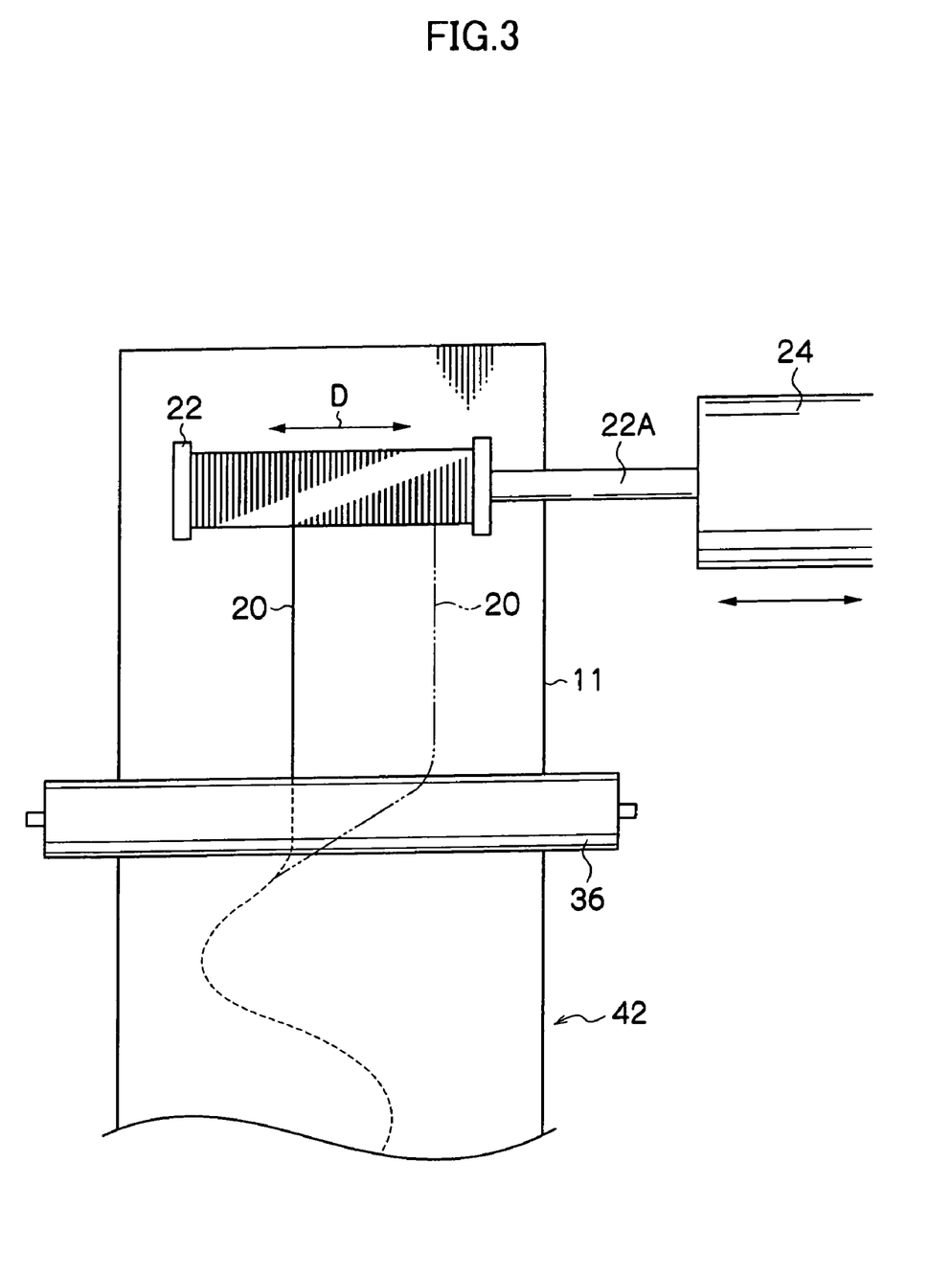
FIG. 3 is a drawing that explains the oscillating motion of the bobbin that sends out the magnetic wire.

As shown in FIG. 3, with this type of scanned medium manufacturing apparatus 10, the bobbin 22 cyclically moves left and right (i.e., in the directions of the D arrows) from a fixed position due to the solenoid 30. Accordingly, the magnetic wire 20 wound therein can be made into a magnetic wire 20A having the sine wave form shown in FIG. 4A based on the sending speeds of the first substrate 11 and second substrate 13; or a magnetic wire 20A shaped to have successive semicircles from left to right, as shown in FIG. 4B. Accordingly, the magnetic wire wound therein can be made into a symmetrical line relative to the imaginary line of the scanned medium. As shown in FIG. 4A, the form of the point symmetry can be completely judged by the points 47 on the surface of the A4-sized scanned medium 54A, however, it is not absolutely necessary to configure the device to completely judge the point symmetry when several waveforms can be attached to one sheet of scanned medium with the width of the wave. Here, reference to point symmetry refers to the fact that the magnetic wire 20 can be layered indistinguishably in the form of the original magnetic wire 20 by rotation arbitrary angle on the planar surface of the scanned medium 54 and /or flipping the scanned media.

It should be noted that in this type of system (especially in the case where semicircular forms are employed) production is not as efficient as in a method where the magnetic wire is sandwiched between the paper in a straight line. Nonetheless, if the sending speeds of the first substrate 11 and the second substrate 13 slow down, then the tension generated when sandwiching the magnetic wire 20 lessens. Accordingly, this method is beneficial in that it becomes more difficult for the magnetic properties of the magnetic wire 20 to be lost.

Further, a single magnetic wire 20 is sandwiched and adhered in between the first substrate 11 and second substrate 13, so large amounts can be produced successively, thus cutting costs.

Figures 5A, 5B:
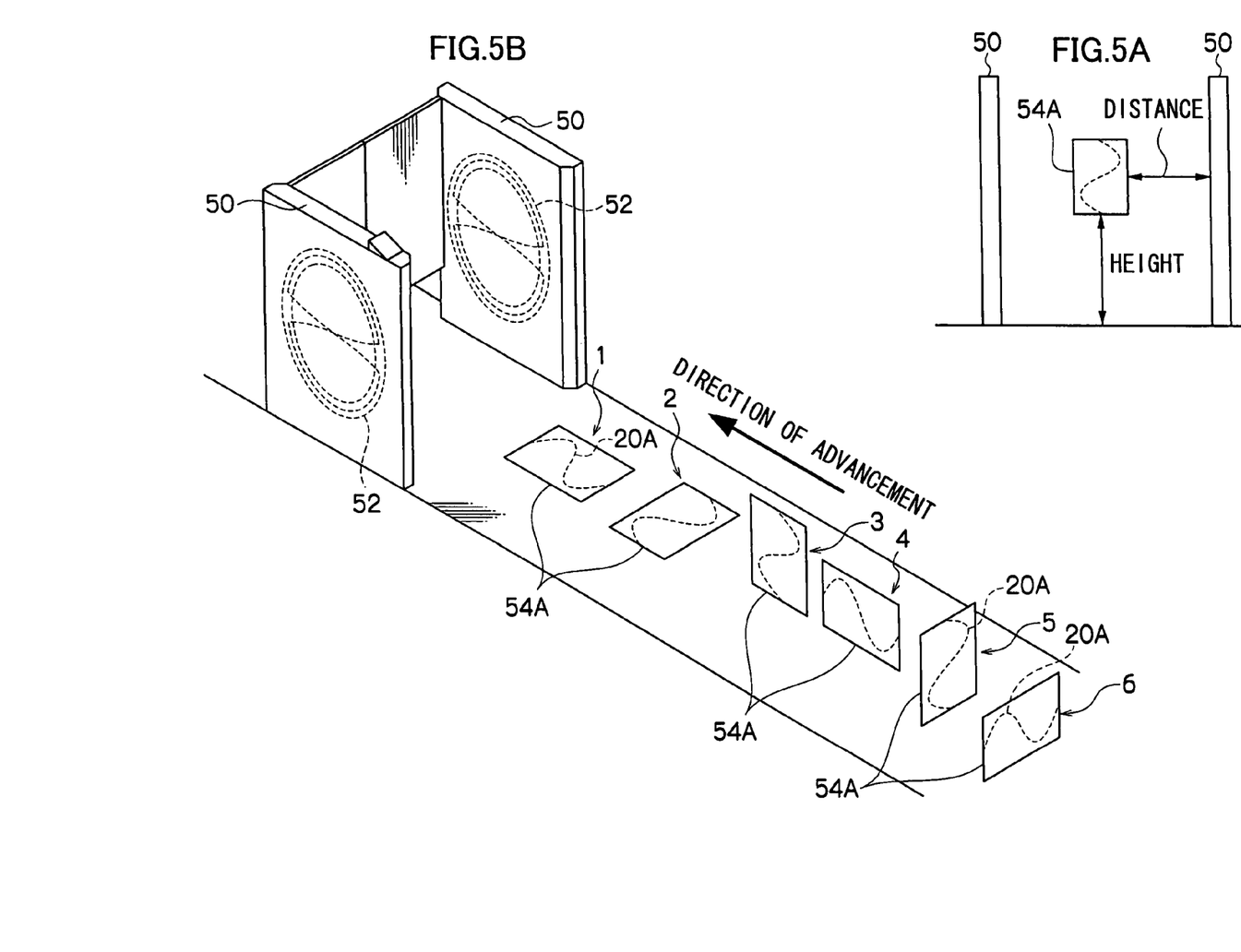
FIG. 5A is an outline drawing of gates that detect a medium being scanned.
FIG. 5B is a drawing showing the direction of the medium being scanned passing through the gates.

FIG. 5A is an outline drawing of two gates 50 that act as a scanning apparatus. Both gates are made to stand perpendicularly to the ground. Further, FIG. 5B shows both the direction in which the scanned medium 54A passes by the gates 50, and the directions in which the ground surface of the scanned medium 54A and the gates 50 face. It should be noted that hereafter, the term "horizontal component" will be used on occasion, and the length of the horizontal component is the length of a shadow line cast that exists in the horizontal direction on the ground assuming that a shadow is cast by the light coming from directly above the ground.

Figure 6:
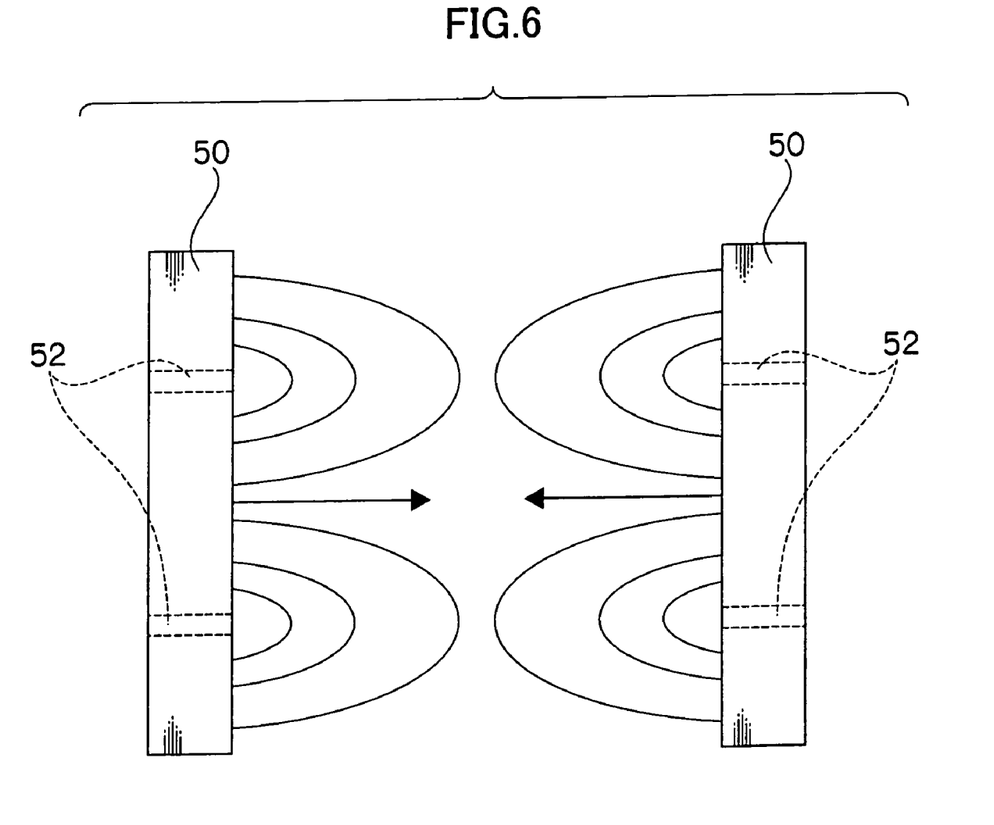
FIG. 6 is a drawing showing the patterns of the direction of the magnetic flux in the gates that detect the medium being scanned.
Figures 7A, 7B:
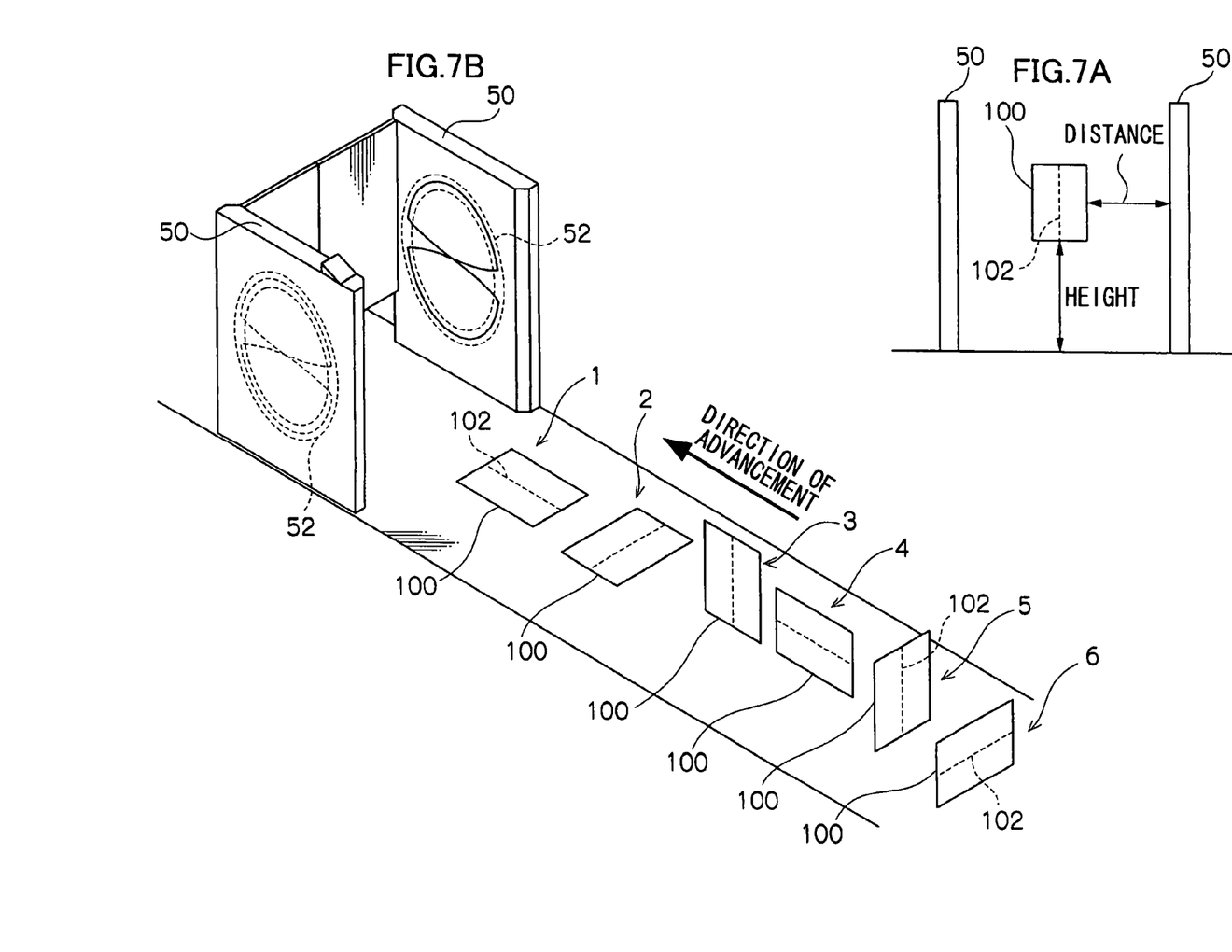
FIG. 7A is an outline drawing of gates in a case where a medium being scanned made with a straight-lined magnetic wire is used, shown as a comparative example.
FIG. 7B is a drawing explaining the state of detection in the direction of the medium being scanned passing through the gates.

Magnetizing antennas 52 made from coils are arranged to face each other in the gates 50, and the center lines of the magnetizing antennas 52 are arranged to be perpendicular to the direction of progression. The magnetic wire 20 is magnetized by the magnetizing antennas 52 of the gates 50, and the Barkhausen effect thereof is detected with a detection antenna. It should be noted that the detection antennas can be set separately from the magnetizing antennas or set to overlap in the vicinities of the magnetizing antennas. It is also possible to utilize the same coil for the magnetizing antenna and the detection antenna with time sharing, so no special configuration has been indicated in the present case. As shown in FIG. 6, the direction of the magnetic flux from the magnetizing antennas 52 extends between the gates 50 in directions perpendicular to the gates 50, and a magnetic field is formed in the central portion where both flux run into each other. At this time, the magnetization increases when compared to the cosine components of the magnetic wire 20 relative to the direction in which the magnetic flux from the magnetizing antennas 52 face (i.e., when compared to the components of the magnetic wire 20 relative to the directions in which the magnetic flux faces). Accordingly, as shown in FIGS. 7A and 7B, when a straight magnetic wire 102 spans a scanned medium 100 in the up and down directions (i.e., when in position 5) the directions in which the magnetic flux faces become perpendicular to the magnetic wire 102 in the proximity thereof, and the magnetic wire components relative to the direction in which the magnetic flux face are almost entirely lost. In contrast, when a magnetic wire 20A with a sine waveform point symmetry is formed such as that shown in FIG. 4A, the components of the magnetic wire 20A relative to the magnetic field that goes out perpendicularly from the gates 50 are maintained with sufficient length to create a sufficient Barkhausen effect, in both cases when the user holds the scanned medium 54A longitudinally (i.e., when in position 5) and when the user holds the scanned medium 54A laterally (i.e., when in position 6). For this reason, the magnetic wire 20A can be detected with the detection antennas at the gates 50, regardless of the direction in which the scanned medium 54A is made to face.

Further, the entire length of the magnetic wire 20A is longer than the length of the scanned medium 54 in the longitudinal direction so, as shown in FIGS. 7A and 7B, a larger output can be obtained than in the case where the straight magnetic wire 102 is formed in the longitudinal direction of the scanned medium 100. For this reason, the magnetic wire 20A can be detected with greater certainty.

Similarly, the magnetic wire 20A shown in FIG. 4B has a shape where the semicircles are shifted only by the amount of the diameter, so if the shifted portions are returned to their original states, these form circles. Accordingly, the components of the magnetic wire 20A relative to the direction of the magnetic field that goes out perpendicularly from the gates 50 can be kept sufficiently positive value to create a sufficient Barkhausen effect, even if the scanned medium 54B is inclined at an arbitrary angle (i.e., and not only when made horizontal or vertical). For this reason, the magnetic wire 20A can be detected with the detection antennas.

It should be noted that the size of the vibrational amplitude of the sine wave is set to be greater than the shortest length of a rectilinear magnetic body that can be detected at the same direction as the magnetic flux in the magnetic filed. This region of magnetic field is decided by the total sum of the absolute value of the cosine projected at the sine wave tangential line axial direction of the magnetic wire 20A with the size at each point of the wire of the magnetization area in the space through which the scanned medium 54A passes through (i.e., the area of the length of the rectilinear magnetic body and the area where magnetization is executed).

Further, as shown in FIG. 4C, in a scanned medium 54C in which a successive step-pattern magnetic wire 20A has been formed, the magnetic wire 20A can also be detected by the detection antennas even when the scanned medium 54C is inclined at an arbitrary angle relative to the magnetic area output perpendicularly from the gates 50.

As explained above, as long as the magnetic wire 20 formed in the scanned medium 54 has a form whose at least one portion has a positive length in a horizontal component, the scanned medium 54 can be faced in any direction.

In more general terms, the magnetic wire 20 can be made to have a form having at least one portion of which has a component that is in the same direction as the direction of the magnetic field, regardless of the direction in which the scanned medium 54 is faced. Due to this, as shown in FIG. 5B, the magnetic wire 20 can be detected by the detection antennas, regardless of the direction in which the scanned medium 54 is faced.

Furthermore, it is easily understood that the length of this type of magnetic wire is longer than the length of the side of the paper at the longitudinal end. This is especially the case if the wavelength of the sine wave is sufficiently long, whereby a straight line or curved line can be formed from a corner of the paper to the opposite corner (or, stated more simply, a straight line or curved line can be formed from one point at the shorthand side of the paper to another point to be matched). In the latter case, if the distance from the point where the wire begins to a corner at the longhand side is not the same as the distance from the point where the wire ends to a different corner at the same longhand side, it is easily observed that the length of the wire becomes longer than the length of the longhand side of the paper.

Next, the results of experiments regarding detection of the magnetic wire 20 will be explained.

Generally speaking, the direction and strength distribution of a magnetic field depends on the shape of the antennas of the twin gates from which the magnetic field is generated. As shown in FIG. 5B, when the two relative antennas are coil-shaped magnetizing antennas 52, the strength of the magnetic field in the center between both magnetizing antennas 52 weakens if the space between both magnetizing antennas 52 is widened. When the antennas are too close to each other, the magnetic fields from the magnetizing antennas 52 run into the opposite directions, and this weakens again the strength of the magnetic field in the vicinity of the center. The gates 50 shown in FIGS. 5A and 5B are used as shoplifting prevention devices, so the opening portion is set at one meter. Accordingly, detection at the vicinity of the center of the gates 50 is the most difficult.

As shown in FIGS. 7A and 7B, one magnetic wire 102 uses an A4-sized scanned medium 100. When the direction in which the scanned medium 100 faces in a three-dimensional space was any of the positions 1-6, it was verified that the magnetic wire 102 was detected. In FIGS. 7A and 7B, a recognition distance (of 45 cm) is sufficiently obtained except for the case of position 5, where the recognition distance from the gates 50 shortens by, for example, 15 cm-20 cm. In a position such as position 5, if the user holds the scanned medium 100 to their chest and passes through the vicinity of the center between the gates 50 while holding the scanned medium 100 such that the magnetic wire 102 is perpendicular to the ground, the magnetic wire 102 is not recognized, whereby the scanned medium 100 passes through undetected. On the other hand, when using the scanned medium 54A with the magnetic wire 20A formed with a point symmetry as shown in FIG. 5B, the same directional components of the magnetic wire 20A relative to the magnetic flux exist even when the magnetic wire 20A is held in a position such as position 5, so the wire can be detected. Similarly, even when the scanned medium 54A is in position 6 where it has been rotated 90°, the same directional components of the magnetic wire 20A relative to the directions of the magnetic flux exist, so the device can be detected.

Further, as shown in FIG. 4B, with a magnetic wire 20A where the shape is shifted by semicircles, it was understood that the scanned medium 54B can be detected even when leaned at an optional angle and not just at 90°. For this reason, the security level can be raised.

It should be noted that in the above-described embodiments, the first substrate 11 and the second substrate 13 were paper, however, other materials such as a film sheet may also be used.

Further, in the above-described embodiments, the bobbin 22 was moved back and forth with the solenoid 30 in a direction perpendicular to the axial line direction of the magnetic wire 20, however, the structure is not thus limited. For example, the bobbin 22 can be provided with a tube that is connected and encases the axis and this tube can be connected to a voice coil motor (VCM) or a stepping motor. The device can be configured such that the bobbin 22 is made to move back and forth at regular intervals. The desired oscillation can be freely set in a VCM along a time axis so the magnetic wire 20 wound inside the material can be made to have a sine waveform or a form where semicircles connect from left to right, based on the speed in which the substrate is sent.

The present invention is not limited to the above explained aspects. There may be various modified aspects within a scope of the present invention as below.

The fifth aspect of the present invention involves the scanned medium of the first or second aspect, where the shape of the magnetic body includes at least one half cycle of a sine wave.

According to the fifth aspect of the present invention, the shape of the magnetic body includes at least one half cycle of a sine wave, so the magnetic field generated by the scanning apparatus never faces just the approximate perpendicular direction of the magnetic body. For this reason, when the magnetic body passes inside the magnetic field, it can be detected with greater certainty.

The sixth aspect of the present invention involves any of the scanning media of the first, second and fifth third aspects, where the shape of the magnetic body forms a line symmetry and/or point symmetry at an arbitrary position.

According to the sixth aspect of the present invention, the shape of the magnetic body forms a line symmetry and/or point symmetry at an arbitrary position, so the magnetic field generated by the scanning apparatus never faces only the approximate perpendicular direction of the magnetic body. For this reason, when the magnetic body passes inside the magnetic field, the body can be detected with greater certainty.

The seventh aspect of the present invention involves any one of the scanning media from the first, second, fifth and sixth aspects, where the entire length of the magnetic body is longer than the length of the sheet substrate in the longitudinal direction.

According to the seventh aspect of the present invention, the entire length of the magnetic body is longer than the length of the sheet substrate in the longitudinal direction. Accordingly, an output that is larger than in a case where one magnetic body is formed in the longitudinal direction of the sheet substrate can be obtained at the time of detection.

What is claimed is:

1. A scanned medium comprising:
    a sheet substrate; and
    a line-shaped magnetic body formed inside the sheet substrate,
    wherein:
        the magnetic properties of the magnetic body are detectable inside a magnetic field formed by a scanning apparatus,
        a form of the magnetic body has a length of horizontal component at least at one portion thereof, the length of the horizontal component being sufficient to be detected inside the magnetic field, regardless of the direction in which the sheet substrate is positioned,
        magnetic properties of the line-shaped magnetic body comprise magnetization reversal or magnetorestrictive oscillations that occur upon application of an electrical field, and
        a form of the line-shaped magnetic body comprises at least one half-cycle portion of a sine wave.

2. The scanned medium of claim 1, wherein a form of the line-shaped magnetic body forms a line symmetry and/or point symmetry at an arbitrary position.

3. The scanned medium of claim 1, wherein an entire length along a form of the line-shaped magnetic body is longer than a length of a longitudinal direction of the sheet substrate.

* * * * *